(12) United States Patent
Yamagata et al.

(10) Patent No.: US 8,671,670 B2
(45) Date of Patent: Mar. 18, 2014

(54) EXHAUST SYSTEM OF MULTI-CYLINDER ENGINE

(75) Inventors: Naoyuki Yamagata, Higashihiroshima (JP); Akira Kageyama, Hiroshima (JP); Takeshi Nagasawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 527 days.

(21) Appl. No.: 13/049,853

(22) Filed: Mar. 16, 2011

(65) Prior Publication Data

US 2011/0239638 A1    Oct. 6, 2011

(30) Foreign Application Priority Data

Mar. 31, 2010    (JP) ................................. 2010-082193

(51) Int. Cl.
  *F01N 1/00*    (2006.01)
(52) U.S. Cl.
  USPC ............................................. 60/324; 60/323
(58) Field of Classification Search
  USPC .................................................. 60/323, 324
  See application file for complete search history.

(56) References Cited

U.S. PATENT DOCUMENTS

2010/0126153 A1*   5/2010   Nagafuchi ........................ 60/299
2011/0016859 A1*   1/2011   Schumnig ........................ 60/323

FOREIGN PATENT DOCUMENTS

JP    2009-097335 A    5/2009
JP    2009097404    *   5/2009

* cited by examiner

*Primary Examiner* — Thomas Denion
*Assistant Examiner* — Matthew T Largi
(74) *Attorney, Agent, or Firm* — Studebaker & Brackett PC

(57) ABSTRACT

Provided is an exhaust system of a multi-cylinder engine capable of increasing the air-intake and thereby increasing the engine output with a simple configuration. The exhaust system is provided with low velocity-side passages 54, high velocity-side passages 53, a low velocity-side collection part 56, a high velocity-side collection part 57, and a flow passage area variable valve 58 capable of changing the flow passage area of the respective high velocity-side passages 53. The relationship of a diameter a1 of a true circle with a same area as the flow passage area of the downstream end of the low velocity-side passages 54, a diameter D1 of a true circle with a same area as the flow passage area of the downstream end of the low velocity-side collection part 56, a diameter a2 of a true circle with a same area as the flow passage area of the downstream end of the high velocity-side passages 53, and a diameter D2 of a true circle with a same area as the flow passage area of the downstream end of the high velocity-side collection part 57 is made to be a1/D1≥a2/D2. In a low velocity region R1, an exhaust valve 20 is opened during the overlap period of an intake valve 19 and the exhaust valve 20 and the flow passage area of the high velocity-side passages 53 is narrowed, and, in a high velocity region R3, the flow passage area of the high velocity-side passages 53 is set to be a maximum area.

13 Claims, 7 Drawing Sheets

EXHAUST SYSTEM OF MULTI-CYLINDER ENGINE

BACKGROUND OF THE INVENTION

1. Field of the Invention

The present invention relates to an exhaust system of a multi-cylinder engine provided to automobiles and the like.

2. Description of the Background Art

Conventionally, exhaust systems aiming to increase the engine output of engines of automobiles and the like have been developed.

For example, Japanese Published Unexamined Application No. 2009-97335 (Patent Document 1) discloses a system including a turbocharger, comprising plurality of independent passages mutually and independently connected to an exhaust port of each of the cylinders, a collection part provided upstream of the turbocharger where the independent passages are assembled, and a valve provided to the collection part and which is capable of changing the flow passage area of the respective independent passages. With this system, the exhaust of the cylinder performing the exhaust stroke is caused to flow from a predetermined independent passage into the collection part at a relatively high velocity by narrowing the flow passage area of the independent exhaust passage with the valve, causes the negative pressure generated around the high velocity exhaust to work on the other independent passages in the collection part, and pumps out the exhaust in the other independent passages to the downstream side based on the so-called ejector effect. The amount of gas that is supplied to the turbocharger is thereby increased.

Demands for increasing the engine output of engines in automobiles and the like are still high, and, in particular, there are demands for increasing the engine output with a simple configuration in an engine system without a turbocharger in which its structure has been simplified.

SUMMARY OF THE INVENTION

Thus, an object of this invention is provide an exhaust system of a multi-cylinder engine capable of increasing the air-intake and thereby increasing the engine output with a simple configuration.

In order to achieve the foregoing object, the exhaust system of a multi-cylinder engine according to the present invention is an exhaust system of a multi-cylinder engine including a plurality of cylinders each formed with an intake port and an exhaust port and provided with an intake valve capable of opening and closing the intake port and an exhaust valve capable of opening and closing the exhaust port. The exhaust system comprises a plurality of independent exhaust passages each of which is connected to an exhaust port of one cylinder or each of a plurality of cylinders for which the exhaust sequence is inconsecutive, and which are respectively separated at least on a downstream side into low velocity-side passages and high velocity-side passages, a low velocity-side collection part which is connected to a downstream end of each of the low velocity-side passages to be in communication with each of the low velocity-side passages and which collects gas that has passed through each of the low velocity-side passages, a high velocity-side collection part which is connected to a downstream end of each of the high velocity-side passages to be in communication with each of the high velocity-side passages and which collects gas that has passed through each of the high velocity-side passages, a flow passage area variable valve which is provided to each of the high velocity-side passages and which is capable of changing a flow passage area of each of the high velocity-side passages, flow passage area variable valve drive means capable of driving the flow passage area variable valve, and valve drive means capable of driving the intake valve and the exhaust valve of each of the cylinders. In a low velocity region in which a revolution of an engine is lower than a pre-set reference revolution and at least in a high load region where a required torque of the engine is high, the valve drive means drives the intake valve and the exhaust valve of each of the cylinders so that an opening period of the intake valve and an opening period of the exhaust valve of each of the cylinders overlap for a predetermined overlap period and so that, between cylinders for which the exhaust sequence is consecutive, the exhaust valve of one cylinder is opened during the overlap period of another cylinder. The flow passage area variable valve drive means drives the flow passage area variable valve so that the flow passage area of each of the high velocity-side passages is smaller than its maximum area at least in the high load region of the low velocity region, and drives the flow passage area variable valve so that a flow passage area of each of the high velocity-side passages is a maximum area in a high velocity region where the revolution of the engine is higher than the reference revolution. The downstream ends of the low velocity-side passages connected to the cylinders for which the exhaust sequence is consecutive among the respective low velocity-side passages are arranged in mutually adjacent positions. The low velocity-side collection part is shaped so that a flow passage area of at least one of its upstream end and its downstream end is a smallest area of the flow passage area of the low velocity-side collection part. The high velocity-side collection part is shaped so that a flow passage area of at least one of its upstream end and its downstream end is a smallest area of the flow passage area of the high velocity-side collection part, and shaped so that a relationship $a1/D1 \geq a2/D2$ is satisfied where $a1$ is a diameter of a true circle with a same area as the flow passage area of the downstream end of the low velocity-side passages, $D1$ is a diameter of a true circle with a same area as the flow passage area of the downstream end of the low velocity-side collection part, $a2$ is a diameter of a true circle with a same area as the flow passage area of the downstream end of the high velocity-side passages, and $D2$ is a diameter of a true circle with a same area as the flow passage area of the downstream end of the high velocity-side collection part.

According to this system, it is possible to inhibit the exhaust resistance in the high velocity region and promote the scavenging in the cylinders while effectively using the ejector effect to promote the scavenging in the cylinders at least in the high load region of the low velocity region, and thereby increase the intake efficiency in all velocity regions and increase the engine output.

DESCRIPTION OF THE PREFERRED EMBODIMENTS

Embodiments of an exhaust system of a multi-cylinder engine according to the present invention is now explained with reference to the attached drawings.

Figure 1:
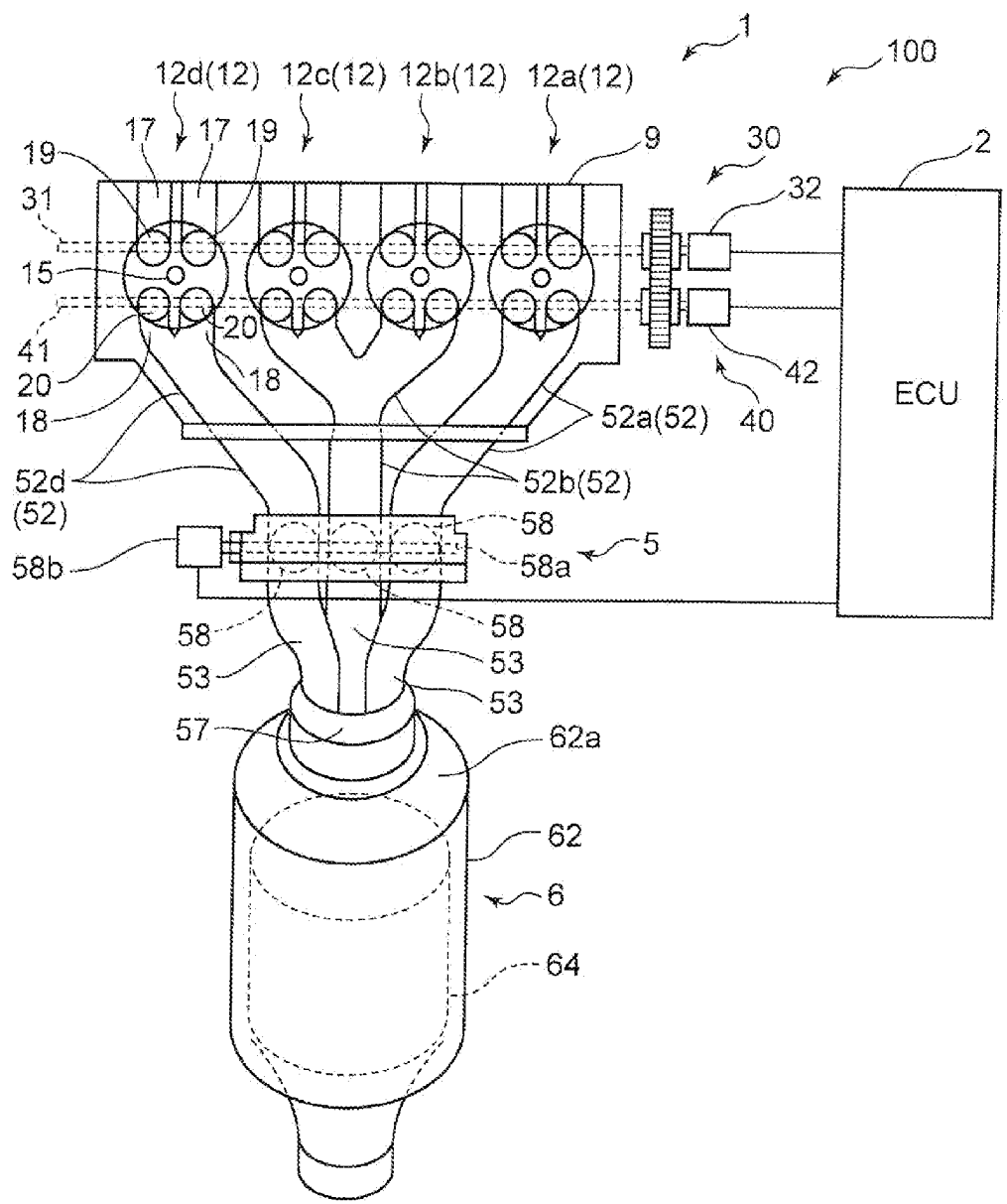
FIG. 1 is a schematic configuration diagram of the engine system comprising the exhaust system of a multi-cylinder engine according to an embodiment of the present invention.

FIG. 1 is a schematic configuration diagram of the engine system 100 comprising the exhaust system of a multi-cylinder engine. The engine system 100 comprises an engine body 1 including a cylinder head 9 and a cylinder block, an ECU 2 for controlling the engine, an exhaust manifold 5 connected to the engine body 1, and a catalytic device 6 connected to the exhaust manifold 5.

A plurality of cylinders 12 in which a piston is respectively inserted therethrough are formed inside the cylinder head 9 and the cylinder block. In this embodiment, the engine body 1 is an in-line four-cylinder engine, and four cylinders 12 are arranged in series and formed inside the cylinder head 9 and the cylinder block. Specifically, in order from the right side of FIG. 1, a first cylinder 12a, a second cylinder 12b, a third cylinder 12c, and a fourth cylinder 12d are formed. Each cylinder head 9 is provided with a spark plug 15 so as to face inside the combustion chamber that is partitioned above the piston.

Figure 6:
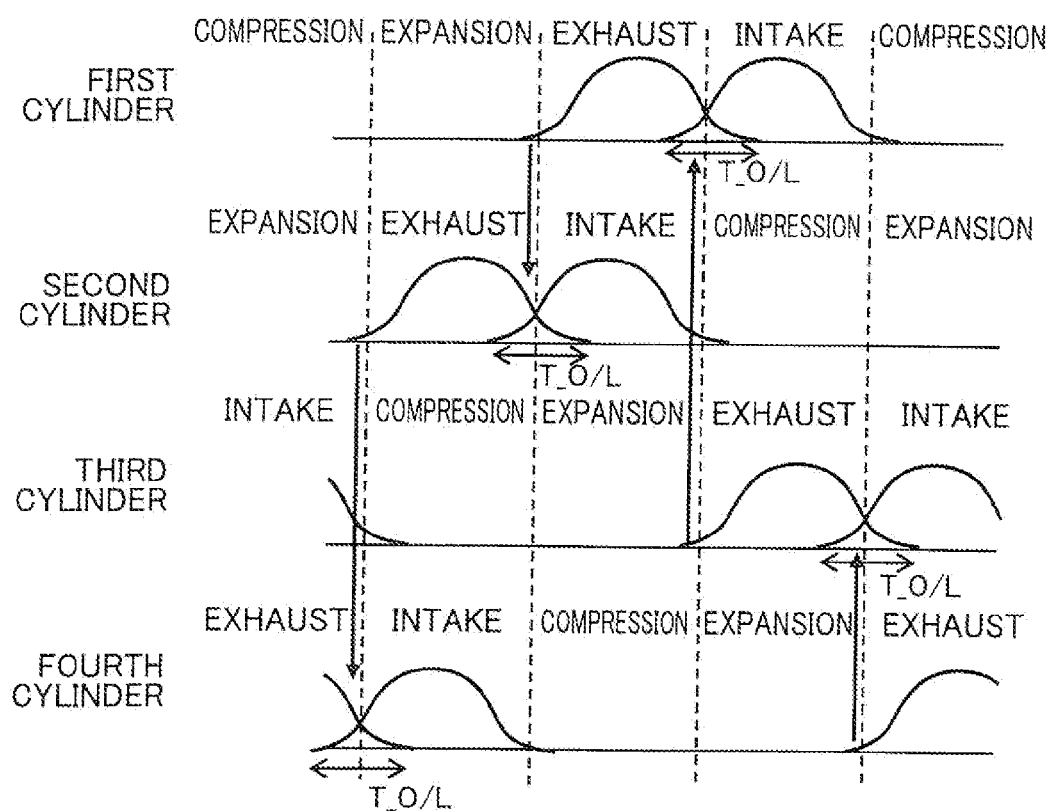
FIG. 6 is a diagram explaining the valve timing of the intake valve and the exhaust valve.

The engine body 1 is a four-stroke engine. In the engine body 1, as shown in FIG. 6, ignition is performed in each of the cylinders 12a to 12d with the spark plug 15 at a timing that is delayed 180° CA for each ignition, and an intake stroke, a compression stroke, an expansion stroke, and an exhaust stroke are respectively performed by each being delayed 180° CA. In this embodiment, ignition is performed in the order of first cylinder 12a, third cylinder 12c, fourth cylinder 12d and second cylinder 12b, and the exhaust stroke and the like are performed in this order.

Two intake ports 17 and two exhaust ports 18 respectively opening toward the combustion chamber are provided above the respective cylinders 12. The intake port 17 is used for introducing the intake into the respective cylinders 12. The exhaust port 18 is used for discharging the exhaust from the respective cylinders 12. Each intake port 17 is provided with an intake valve 19 for communicating or blocking the passage between the intake port 17 and the inside of the cylinder 12 by opening and closing the intake ports 17. Each exhaust port 18 is provided with an exhaust valve 20 for communicating or blocking the passage between the exhaust port 18 and the inside of the cylinder 12 by opening and closing the exhaust ports 18. The intake valve 19 opens and closes the intake ports 17 at a predetermined timing by being driven with an intake valve drive mechanism (valve drive means) 30. Moreover, the exhaust valve 20 opens and closes the exhaust ports 18 at a predetermined timing by being driven with an exhaust valve drive mechanism (valve drive means) 40.

The intake valve drive mechanism 30 includes an intake cam shaft 31 and an intake VVT 32 connected to the intake valve 19. The intake cam shaft 31 is connected to a crank shaft via a power transmission mechanism such as a well-known chain/sprocket mechanism or the like, and open/close-drives the intake valve 19 by being rotated pursuant to the rotation of the crank shaft.

The intake VVT 32 is used for changing the valve timing of the intake valve 19. The intake VVT 32 changes the phase difference between a predetermined driven axis, which is disposed coaxially with the intake cam shaft 31 and directly driven with the crank shaft, and the intake cam shaft 31. The phase difference between the crank shaft and the intake cam shaft 31 is thereby changed, and the valve timing of the intake valve 19 is changed. As a specific configuration of the intake VVT 32, for example, there is a hydraulic mechanism including a plurality of liquid chambers aligned in the circumferential direction between the driven axis and the intake cam shaft 31 and which changes the phase difference by providing a pressure difference between the liquid chambers, and an electromagnetic mechanism in which electromagnets are provided between the driven axis and the intake cam shaft 31 and which changes the phase difference by applying electrical power to the electromagnet. The intake VVT 32 changes the phase difference based on the target valve timing of the intake valve 19 calculated with the ECU 2.

The exhaust valve drive mechanism 40 has the same structure as the intake valve drive mechanism 30. The exhaust valve drive mechanism 40 includes an exhaust cam shaft 41 connected to the exhaust valve 20 and the crank shaft, and an exhaust VVT 42 which changes the valve timing of the exhaust valve 20 by changing the phase difference between the exhaust cam shaft 41 and the crank shaft. The exhaust VVT 42 changes the phase difference based on the target valve timing of the exhaust valve 20 calculated with the ECU 2. The exhaust cam shaft 41 open/close-drives the exhaust valve 20 at the target valve timing by rotating pursuant to the rotation of the crank shaft under the foregoing phase difference.

Note that, in this embodiment, the intake VVT 32 and the exhaust VVT 42 respectively change the valve open timing and the valve close timing of the intake valve 19 and the exhaust valve 20 while respectively maintaining the opening period and the lift; that is, the valve profile, of the intake valve 19 and the exhaust valve 20 to be constant.

The exhaust port 18 of each of the cylinders 12 is connected to the independent exhaust passage 52 on its downstream side. Among the cylinders 12, the exhaust port 18 of the first cylinder 12a and the exhaust port 18 of the fourth cylinder 12d are respectively and individually connected to the independent exhaust passages 52a, 52d. Meanwhile, the exhaust ports 18 of the second cylinder 12b and the third cylinder 12c provided at the center of the engine body 1 and for which the exhaust sequence is inconsecutive are connected to one independent exhaust passage 52b. The independent exhaust passages 52 are mutually independent. The exhaust emitted from the second cylinder 12b or the third cylinder 12c, the exhaust emitted from the first cylinder 12a, and the exhaust emitted from the fourth cylinder 12d mutually and independently pass through the respective independent exhaust passages 52 and flow downward. In this embodiment, the upstream portion of the independent exhaust passages 52 is formed within the cylinder head 9, and the downstream portion of the independent exhaust passages 52 is provided to the exhaust manifold 5.

In addition to the three independent exhaust passages 52, the exhaust manifold 5 comprises three flow passage area variable valves 58, a low velocity-side collection part 56, and a high velocity-side collection part 57.

Figure 2:
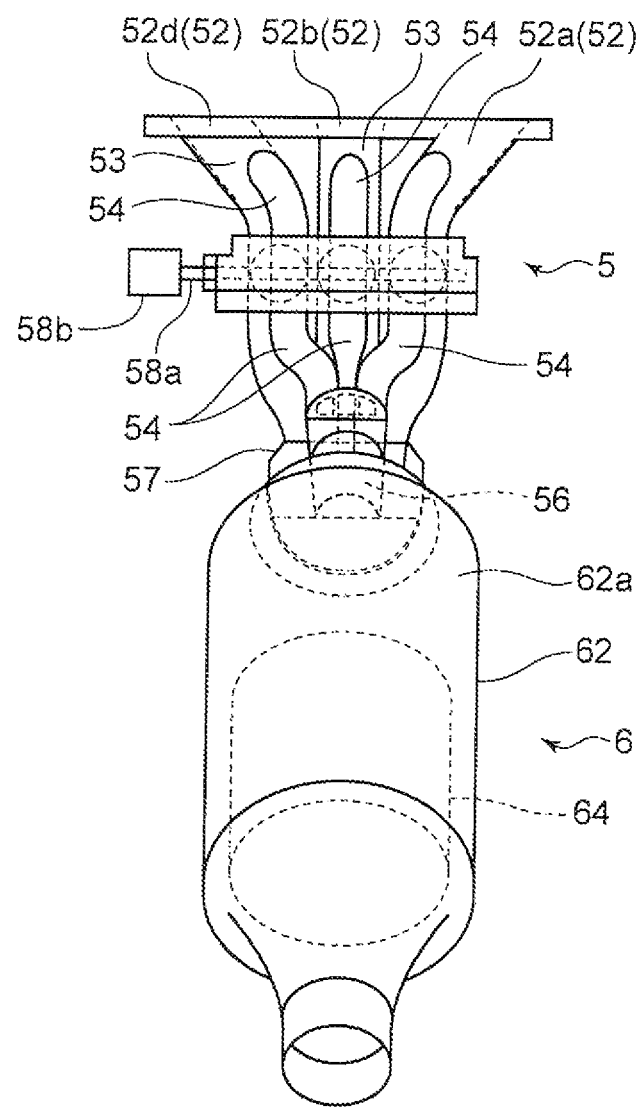
FIG. 2 is a diagram showing the portion of the downstream side of the engine body 1 illustrated in FIG. 1 from below.
Figure 3:
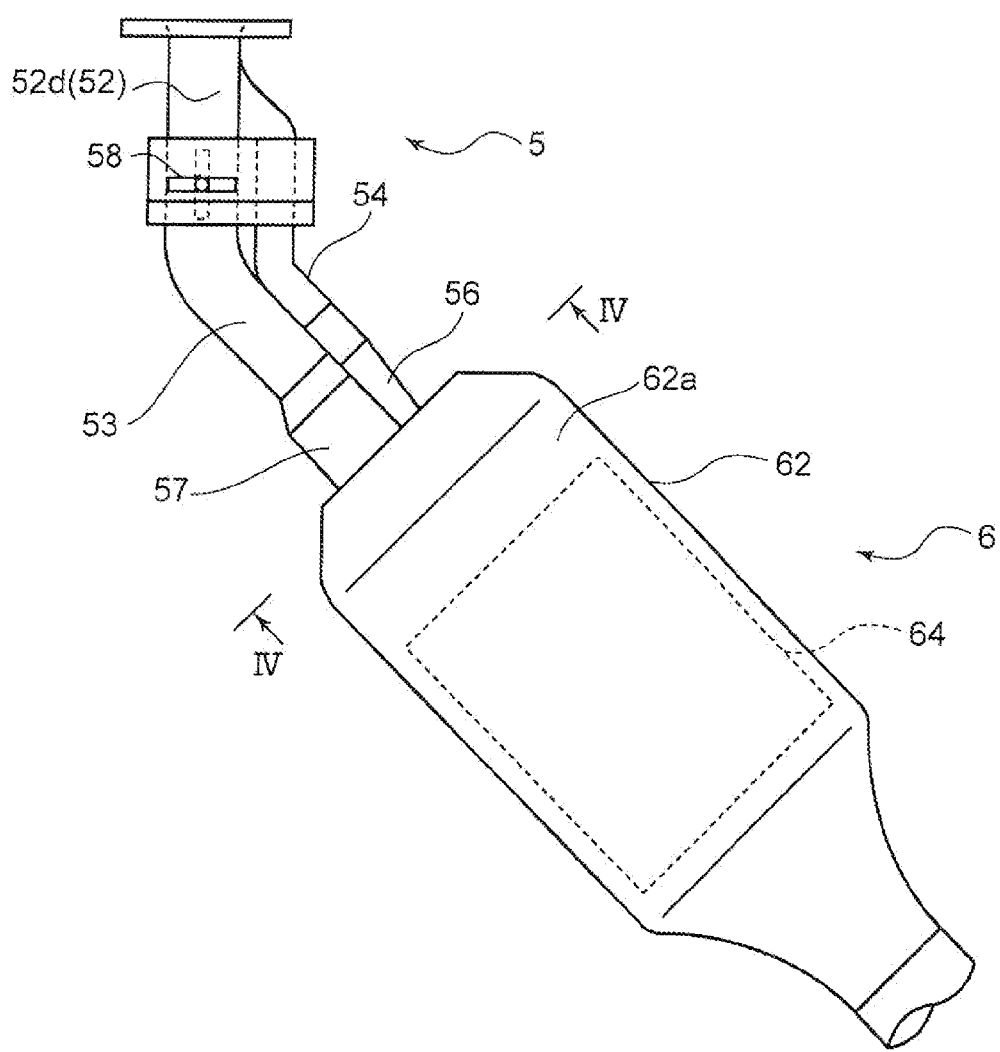
FIG. 3 is a side view of the portion of the downstream side of the engine body 1 illustrated in FIG. 2.
Figure 4:
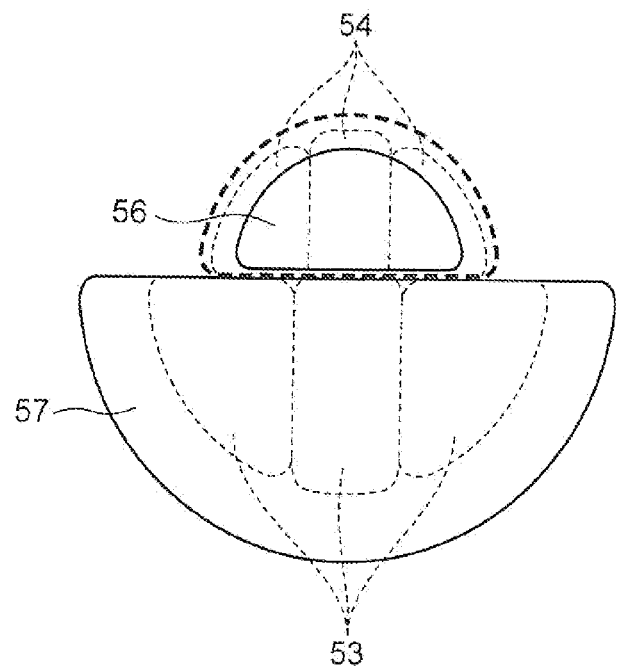
FIG. 4 is a cross sectional view of line IV-IV of FIG. 3.

Each of the independent exhaust passages 52 is separated to a high velocity-side passage 53 and a low velocity-side passage 54 on its downstream side. In this embodiment, this location of separation is positioned near the upstream end of the exhaust manifold 5. Moreover, in this embodiment, as shown in FIG. 2 and FIG. 3, each high velocity-side passage 53 extends linearly backward from the upstream side portion of the independent exhaust passage 52 formed on the cylinder head 9, and thereafter bends downward and backward. Meanwhile, each low velocity-side passage 54 bends downward from the vicinity of the upstream end of the exhaust manifold 5 and passes below the high velocity-side passage 53, and, as with the high velocity-side passage 53, extends linearly backward and thereafter bends downward.

The cross-sectional area; that is, the flow passage area of each of the high velocity-side passages 53 is set to be mutually the same. The cross-sectional area; that is, the flow passage area of each of the low velocity-side passages 54 is set to be mutually the same. The flow passage area of each of the high velocity-side passages 53 is set to be greater than the flow passage area of the low velocity-side passages 54.

The flow passage area variable valve 58 is used for changing the flow passage area of each of the high velocity-side passages 53, and thereby changing the flow passage area of each of the independent exhaust passages 52. One flow passage area variable valve 58 is provided within each of the high velocity-side passages 53. In this embodiment, the flow passage area variable valves 58 are provided near the upstream end within the high velocity-side passage 53 and in the vicinity where the high velocity-side passage 53 and the low velocity-side passage 54 become separated.

The flow passage area variable valve 58 rotates around a pivot axis 58a provided to its center as a result of the pivot axis 58a being rotatably driven. In this embodiment, a common pivot axis 58a is fixed to each flow passage area variable valve 58, and the three flow passage area variable valves 58 rotate integrally. Each flow passage area variable valve 58 rotates between a full open position (broken line of FIG. 3) which spreads in a direction that is approximately parallel with the flow direction of the exhaust and a full close position (solid line of FIG. 3) which spreads in a direction that is approximately perpendicular to the flow direction of the exhaust, and changes the flow passage area of the high velocity-side passages 53 by opening and closing the high velocity-side passage 53. Note that, in FIG. 3, the flow passage area variable valve 58 disposed within the high velocity-side passage 53 and which should be shown with a broken line is shown with a solid line in order to more clearly indicate the full open position and the full close position of the flow passage area variable valve 58.

The pivot axis 58a is rotatably driven with a valve actuator (flow passage area variable valve drive means) 58b provided at its end. The valve actuator 58b rotates the pivot axis 58a according to the target opening of the flow passage area variable valve calculated with the ECU 2 and drives the flow passage area variable valve 58 to a full close or full open position. The valve actuator 58b may be any kind of valve actuator so as long as it is able to rotatably drive the pivot axis 58a and rotate the flow passage area variable valve 58.

The low velocity-side collection part 56 is provided on the downstream side of the low velocity-side passage 54. The low velocity-side collection part 56 is connected to the downstream end of each low velocity-side passage 54 to be in communication with each low velocity-side passage 54. The gas that has passed through each low velocity-side passage 54 is collected at the low velocity-side collection part 56. In this embodiment, the cross-sectional shape of the upstream end of the low velocity-side collection part 56 is a generally semi-circular shape.

The cross-sectional shape of each of the low velocity-side passages 54 is a generally circular shape at the upstream side portion, and transforms from a generally circular shape to a shape in which a semi-circular shape is tri-partitioned in the radial direction as it heads downstream at the downstream side portion. The low velocity-side passages 54 are assembled so that the cross section of their downstream ends forms a generally semi-circular shape as a whole and are connected to the upstream end of the generally semi-circular shape cross section of the low velocity-side collection part 56. The downstream ends of the low velocity-side passages 54 are aligned in the radial direction and connected to the upstream end of a generally semi-circular shape cross section of the low velocity-side collection part 56. The low velocity-side passage 54 connected respectively to the second cylinder 12b and the third cylinder 12c is disposed at the center in the radial direction, and the low velocity-side passage 54 connected to the first cylinder 12a and the low velocity-side passage 54 connected to the fourth cylinder 12d are respectively disposed at either side thereof. As described above, the exhaust stroke is performed in the order of first cylinder 12a, third cylinder 12c, fourth cylinder 12d and second cylinder 12b, and the low velocity-side passages 54 connected to the cylinders 12 for which the exhaust sequence is consecutive are disposed in a mutually adjacent state. The flow passage area of the downstream end of the three low velocity-side passages 54 is set to be mutually the same.

Figure 5:
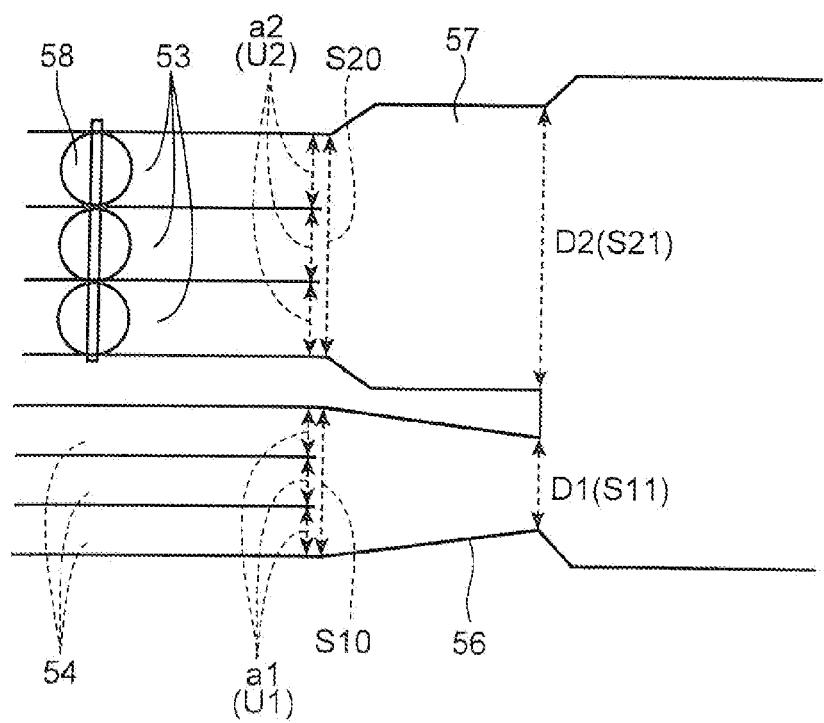
FIG. 5 is a diagram explaining the configuration of the collection portion of the low velocity-side passage and the high velocity-side passage.

The cross-sectional shape and cross-sectional area of the upstream end of the low velocity-side collection part 56 and the cross-sectional shape and cross-sectional area of the overall downstream end of the three low velocity-side passages 54 are set to be approximately the same. Specifically, in FIG. 5 which schematically shows the respective low velocity-side passages 54 and the high velocity-side passages 53, $3 \times U1$ (total of the cross-sectional areas U1 of the downstream end of the low velocity-side passages 54)=S10 (cross-sectional area of the upstream end of the low velocity-side collection part 56).

The cross-sectional area; that is, the flow passage area of the low velocity-side collection part 56 narrows as it heads downstream, and the cross-sectional area S11 of the downstream end of the low velocity-side collection part 56 is set to be smaller than the cross-sectional area S10 of its upstream end ($S11<S10=3 \times U1$). Specifically, if the diameter of a true circle with the same area as the cross-sectional area of the downstream end of the low velocity-side passage 54 is set as a1, and the diameter of a true circle with the same area as the flow passage area of the downstream end of the low velocity-side collection part 56 is set as D1, the relationship of these diameters is $a1/D1 \geq 0.57$. In this embodiment, the setting is $a1/D1=0.65$.

The high velocity-side collection part 57 is provided on the downstream side of the high velocity-side passage 53. The high velocity-side collection part 57 is connected to the downstream end of each high velocity-side passage 53 to be in communication with each high velocity-side passage 53. The gas that has passed through each high velocity-side passage 53 is collected at the high velocity-side collection part 57. In this embodiment, the cross-sectional shape of the upstream end of the high velocity-side collection part 57 is a generally semi-circular shape.

The cross-sectional shape of each of the high velocity-side passages 53 is a generally circular shape at the upstream side portion, and transforms from a generally circular shape to a shape in which a semi-circular shape is tri-partitioned in the radial direction as it heads downstream at the downstream side portion. The high velocity-side passages 53 are assembled so that the cross section of their downstream ends forms a generally semi-circular shape as a whole and are connected to the upstream end of the generally semi-circular shape cross section of the high velocity-side collection part 57. The downstream ends of the three high velocity-side passages 53 are aligned in the radial direction and connected to the upstream end of a generally semi-circular shape cross section of the high velocity-side collection part 57. The high velocity-side passage 53 connected respectively to the second cylinder 12b and the third cylinder 12c is disposed at the center in the radial direction, and the high velocity-side passage 53 connected to the first cylinder 12a and the high velocity-side passage 53 connected to the fourth cylinder 12d are respectively disposed at either side thereof. The flow passage area of the downstream end of the three high velocity-side passages 53 is set to be mutually the same.

The cross-sectional shape and cross-sectional area of the upstream end of the high velocity-side collection part 57 and the cross-sectional shape and cross-sectional area of the overall downstream end of the three high velocity-side passages 53 are set to be approximately the same. Specifically, in FIG. 5 which schematically shows the configuration of the respective passages, 3×U2 (total of the cross-sectional areas U2 of the downstream end of the high velocity-side passages 53)=S20 (cross-sectional area of the upstream end of the high velocity-side collection part 57).

The high velocity-side collection part 57 is shaped such that its cross-sectional area; that is, the flow passage area enlarges as it heads downstream, and thereafter extends to the downstream side at a constant cross-sectional area. The cross-sectional area S21 of the downstream end of the high velocity-side collection part 57 is set to be greater than the cross-sectional area S20 of its upstream end (S21>S20=3×U2). Specifically, if the diameter of a true circle with the same area as the cross-sectional area of the downstream end of the high velocity-side passage 53 is set as a2, and the diameter of a true circle with the same area as the flow passage area of the downstream end of the high velocity-side collection part 57 is set as D2, the relationship of these diameters is a2/D2≤0.57. In this embodiment, the setting is a2/D2=0.3.

The results of examining the relationship of the foregoing a1/D1 or a2/D2 and the charging efficiency ηc are now explained with reference to FIG. 9.

Figure 9:
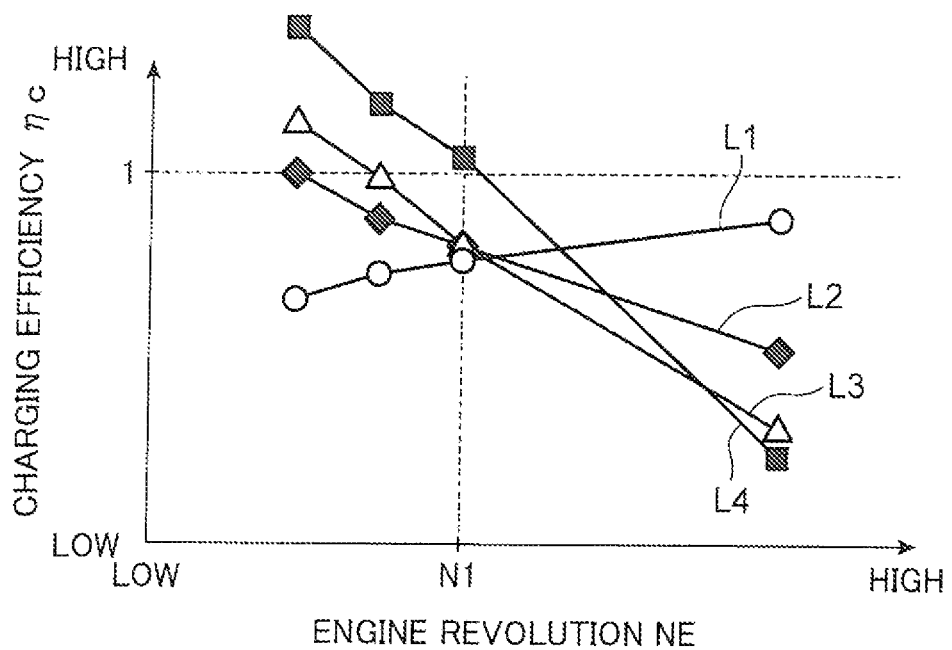
FIG. 9 is a graph showing the relationship between a/D and the charging efficiency.

The graph of FIG. 9 shows the results upon examining the relationship of the engine revolution NE and the charging efficiency ηc in an engine system configured the same as the engine system of this embodiment; specifically, the exhaust port 18 of the first cylinder 12a and the exhaust port 18 of the fourth cylinder 12d among the cylinders 12 of the in-line four-cylinder engine body 1 are respectively and individually connected to the independent exhaust passage, and the exhaust ports 18 of the second cylinder 12b and the third cylinder 12c in which their exhaust strokes are not adjacent and their exhaust sequence is inconsecutive are connected to one independent exhaust passage 52b, and the independent exhaust passages are connected to a predetermined collection part without being separated into a high velocity-side passage and a low velocity-side passage so that the gases that have passed through the independent exhaust passages converge at the collection part, and setting the diameter of a true circle with the same area as the flow passage area of the downstream end of the respective independent exhaust passages as a and setting the diameter of a true circle with the same area as the flow passage area of the downstream end of the collection part as D, and changing a/D. Moreover, the results are of a case where the exhaust valve 20 and the intake valve 19 are set so that the opening period of the exhaust valve 20 and the opening period of the intake valve 19 overlap, and the exhaust valve 20 starts to open during the overlap period T_O/L of the other cylinders 12.

In this graph, the horizontal axis if the engine revolution NE, and the vertical axis is the charging efficiency ηc. Line L1 is a/D=0.3, line L2 is a/D=0.5, line L3 is a/D=0.57, and line L4 is a/D=0.65.

Under the condition of a/D=0.57, the total cross-sectional area of the downstream end of the three independent exhaust passages is the same as the cross-sectional area of the downstream end of the collection part. Moreover, under this condition, the cross-sectional area of the collection part is constant from the upstream end to the downstream end. Under the condition of a/D>0.57, the total cross-sectional area of the downstream end of the three independent exhaust passages is greater than the cross-sectional area of the downstream end of the collection part. Moreover, under this condition, the cross-sectional area of the upstream end of the collection part is approximately the same as the total cross-sectional area of the downstream end of the independent exhaust passages. Meanwhile, the cross-sectional area of the collection part is reduced as it heads from the upstream end toward the downstream. Under the condition of a/D<0.57, the cross-sectional area of the downstream end of the collection part is greater than the total cross-sectional area of the downstream end of the three independent exhaust passages. Moreover, under this condition, the cross-sectional area of the upstream end of the collection part is approximately the same as the total cross-sectional area of the downstream end of the independent exhaust passages. Meanwhile, the cross-sectional area of the collection part is enlarged as it heads from the upstream end toward the downstream.

As shown in this graph, in the low velocity region where the engine revolution NE is not greater than the reference revolution N1, the charging efficiency ηc increases as the a/D becomes greater. Meanwhile, in the high velocity region where the engine revolution NE is higher than the reference revolution N1, the charging efficiency ηc increases as the a/D becomes smaller.

This is considered to be a result of the flow rate of the exhaust passing through the collection part increasing and the scavenging performance based on the ejector effect improving pursuant to the increase of the a/D and the decrease in the cross-sectional area of the collection part toward the downstream side; that is, the narrowing of the collection part on the downstream side in the low velocity region where the engine revolution NE is not greater than the reference revolution N1. Moreover, in the high velocity region where the engine revolution NE is higher than the reference revolution N1, this is considered to be a result of the back pressure reducing and the exhaust performance improving pursuant to the decrease in the a/D and the increase in the cross-sectional area; that is, the flow passage area of the collection part.

Specifically, when a predetermined exhaust valve 20 performing an exhaust stroke is opened and high-velocity exhaust is ejected from the collection part to a predetermined independent exhaust passage and the exhaust pass through the collection part at a high velocity, based on the effect of the negative pressure generated around the exhaust; that is, based on the ejector effect, force is applied for pumping the gas inside the other independent exhaust passages in communication with the collection part toward the downstream side. In addition, as a result of the other cylinders being in the overlap period when the predetermined exhaust valve 20 is opened, the pumping force based on the exhaust discharged from the cylinders performing the exhaust stroke works on the gas inside the cylinders 12 in the overlap period via the independent exhaust passages, and the residual gas in the cylinders 12 in the overlap period is pumped out from the cylinders 12. The pumping effect; that is, the scavenging promotion effect of residual gas based on the ejector effect increases as the flow rate of the exhaust passing through the collection part becomes higher. The flow rate of the exhaust passing through the collection part becomes faster as a result of the deterioration in the velocity in the collection part being inhibited as the a/D increases and the downstream end of the collection part is narrowed.

Meanwhile, the exhaust resistance will increase if the a/D is large and the flow passage area of the downstream end of the collection part is small.

Thus, as described above, it is considered that the scavenging performance will improve as the a/D becomes greater in the low velocity region where the exhaust flow rate is relatively low. Moreover, if the a/D is increased under the condition where the engine revolution NE is high and the exhaust flow rate is high, the effect based on the increase of the back pressure caused by the increase in the exhaust resistance becomes greater than the scavenging promotion effect based on the ejector effect, and it is considered that the scavenging performance thereby deteriorates.

Thus, with the engine system 100, as described above, the independent exhaust passages 52 are separated into the low velocity-side passages 54 and the high velocity-side passages 53, and the a/D; that is, a1/D1 of the low velocity-side passages 54 is set be a value of 0.57 or higher, and the a/D; that is, a2/D2 of the high velocity-side passages 53 is set to be a value that is 0.57 or less to realize a1/D1≥a2/D2. Moreover, as described later, in the low velocity region where the engine revolution NE is not greater than the reference revolution N1, the scavenging based on the ejector effect is promoted by passing the exhaust only through the low velocity-side passages 54, and, in the high velocity region where the engine revolution NE is higher than the reference revolution N1, the increase in the back pressure is inhibited and the high scavenging performance is maintained by causing the exhaust to pass through the high velocity-side passages 53 in addition to the low velocity-side passages 54. Note that, so as long as a1/D1≥a2/D2 is satisfied, the specific range of a1/D1 and a2/D2 is not limited to a1/D1≥0.57 and a2/D2≤0.57, but as shown in the graph of FIG. 9, if the range is set to a1/D1≥0.57, the charging efficiency of 1 or more can be achieved in the low velocity region, and preferably the range is set as described above.

Here, in cases where a/D≥0.57; that is, cases where the cross-sectional area of the downstream end of the collection part is set to be not greater than the total cross-sectional area of the downstream end of the respective independent exhaust passages, if the cross-sectional area of the collection part becomes great between its upstream end and the downstream end, the velocity of the exhaust in this portion will deteriorate and weaken the ejector effect. Thus, the low velocity-side collection part 56 which achieves a/D≥0.57, as described above, is shaped such that the area of the upstream end of the low velocity-side collection part 56 is set to be approximately the same as the total cross-sectional area of the downstream end of the respective low velocity-side passages 54, and its cross section is reduced toward the downstream side.

Meanwhile, in cases where a/D≤0.57; that is, cases where the cross-sectional area of the downstream end of the collection part is set to be greater than the total cross-sectional area of the downstream end of the respective independent exhaust passages, the effect of reducing the back pressure can be achieved even if the cross-sectional area of the collection part becomes greater than the total cross-sectional area of the downstream end of the respective independent exhaust passages between its upstream end and downstream end. Thus, with the high velocity-side collection part 57 which achieves a/D≤0.57, it will suffice so as long as the cross-sectional area of the high velocity-side collection part 57 from its upstream end to the downstream end is greater than the total cross-sectional area of the downstream end of the respective high velocity-side passages 53, and, for example, the cross-sectional area of the upstream end of the high velocity-side collection part 57 may be greater than the total cross-sectional area of the downstream end of the respective high velocity-side passages 53.

A casing 62 described later of the catalytic device 6 is connected respectively to the downstream end of the low velocity-side collection part 56 and the downstream end of the high velocity-side collection part 57, and the exhaust that has passed through the low velocity-side collection part 56 and the high velocity-side collection part 57 flows into the casing 62.

The catalytic device 6 is a device for purifying the exhaust emitted from the engine body 1. The catalytic device 6 comprises a catalyst body 64 of a ternary catalyst or the like and a casing 62 for housing the catalyst body 64. The casing 62 has an approximately cylindrical shape extending parallel to the flow direction of the exhaust. The catalyst body 64 is housed in the downstream portion of the casing 62, and a predetermined space is formed in an upstream portion 62a of the casing 62 for enabling the gas that flows into the casing 62 to be mixed.

The casing 62 of the catalytic device 6 is connected to the downstream end of the low velocity-side collection part 56 and the downstream end of the high velocity-side collection part 57 in a state of being in communication with the low velocity-side collection part 56 and the high velocity-side collection part 57. Accordingly, the exhaust that has passed through the low velocity-side collection part 56 and the exhaust that has passed through the high velocity-side collection part 57 flow into the casing 62 and are collected in the casing 62. As described above, in this embodiment, the upstream portion 62a of the casing 62 of the catalytic device 6 functions as the final collection part for collecting the gas that has passed through the low velocity-side collection part 56 and the high velocity-side collection part 57.

The ECU 2 is a controller based on a well-known microcomputer, and comprises a CPU for executing programs, a memory configured from a RAM or a ROM for storing programs and data, and an I/O bus for performing the input/output of various signals. The ECU 2 receives signals from various sensors via the I/O bus and performs various types of arithmetic processing based on the foregoing signals.

The ECU 2 computes the target valve timing of the intake valve 19 and the exhaust valve 20 and computes the target opening of the flow passage area variable valve 58 according to the driving conditions. In addition, the ECU 2 drives the intake VVT 32, the exhaust VVT 42, and the valve actuator 58b so that the valve timing of the intake valve 19 and the exhaust valve 20 and the opening of the flow passage area variable valve become the foregoing target values.

Figure 7:
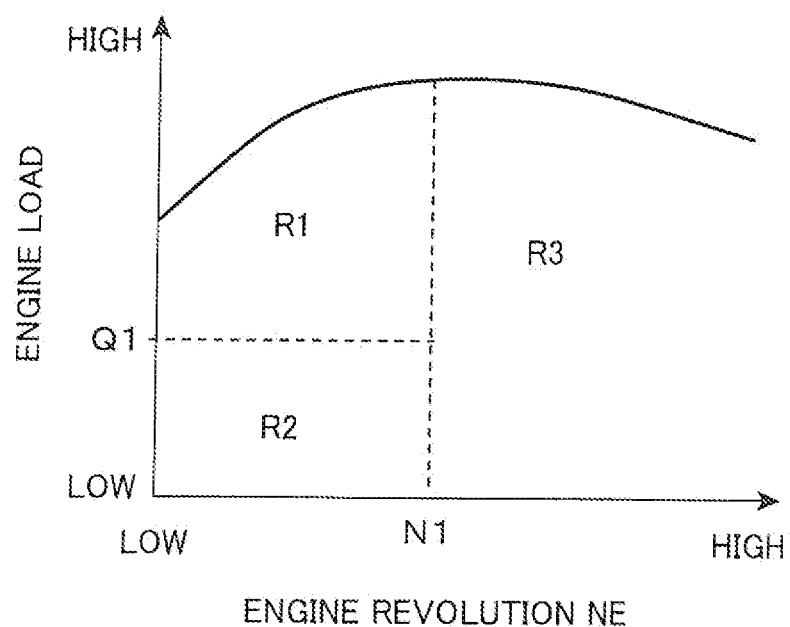
FIG. 7 is a diagram showing the regions in which the intake valve, the exhaust valve, and the flow passage area variable valve controlled in each difference way.

The target valve timing of the intake valve 19 and the exhaust valve 20 is set, as shown in FIG. 6, so that both the exhaust valve 20 and the intake valve 19 are opened for a predetermined overlap period T_O/L and the opening period of the exhaust valve 20 and the opening period of the intake valve 19 overlap and the exhaust valve 20 starts to open when the other cylinders 12 are in the overlap period T_O/L in the low velocity high load region R1 (refer to FIG. 7); that is, in the low velocity region where the revolution of the engine is lower than the reference revolution N1 and in the high load region where the required torque; that is, the engine load of the engine body 1 is higher than the reference load Q1. Specifically, the exhaust valve 20 of the third cylinder 12c is opened during the period that the intake valve 19 and the exhaust valve 20 of the first cylinder 12a are overlapping, the exhaust valve 20 of the fourth cylinder 12d is opened during the period that the intake valve 19 and the exhaust valve 20 of the third cylinder 12c are overlapping, the exhaust valve 20 of the second cylinder 12b is opened during the period that the intake valve 19 and the exhaust valve 20 of the fourth cylinder 12d are overlapping, and the exhaust valve 20 of the first cylinder 12a is opened during the period that the intake valve 19 and the exhaust valve 20 of the second cylinder 12b are overlapping.

Meanwhile, in the high velocity region R3 (refer to FIG. 7) where the revolution of the engine is higher than the reference revolution N1, the target valve timing of the intake valve 19 and the exhaust valve 20 is set so that the overlap period T_L/O is smaller (including 0) than the overlap period set in the low velocity high load region R1.

Moreover, in the low velocity low load region R2 (refer to FIG. 7) where the revolution of the engine is lower than the reference revolution N1 and the engine load is lower than the reference load Q1, the target valve timing of the intake valve 19 and the exhaust valve 20 is set so that the overlap period T_L/O of the exhaust valve 20 and the intake valve 19 is smaller than the overlap period set in the low velocity high load region R1.

In the respective regions, the target valve timing of the exhaust valve 20 and the intake valve 19 is set in detail according to the engine revolution NE, or according to the engine revolution NE and the engine load while maintaining the setting of the foregoing overlap period, and the ECU 2 stores a map of the preset target valve timing of the exhaust valve 20 and the intake valve 19. The ECU 2 extracts the target valve timing from the map according to the driving conditions.

The reference revolution N1 is, for example, 2000 rpm, and the reference load Q1 is, for example, a load of approximately ½ of the maximum load. Moreover, the overlap period T_O/L of the low velocity high load region R1 is, for example, set to be 60° CA or more such as 80° CA, and the overlap period T_O/L of the high velocity region R3 is, for example, set to 40° CA or less.

Figure 8:
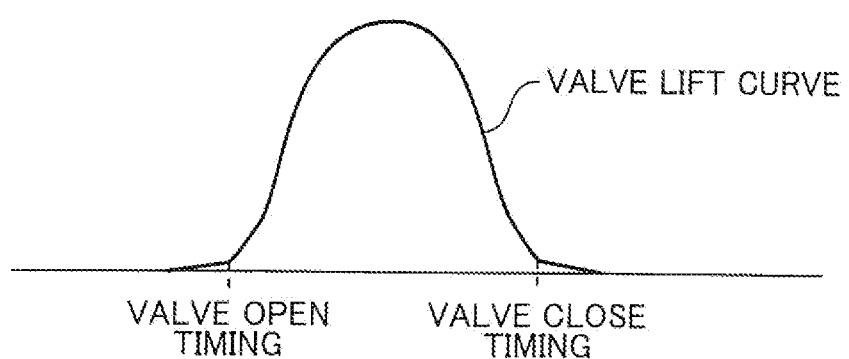
FIG. 8 is a diagram explaining the valve open timing and the valve close timing of the intake valve and the exhaust valve in the exhaust system of a multi-cylinder engine according to an embodiment of the present invention.

Note that, with the engine system 100, the valve open timing and the valve close timing of the intake valve 19 and the exhaust valve 20 are respectively the timing where the lift of the valve rises or falls steeply in the lift curve of the respective valves as shown in FIG. 8, and, for example, this is the timing of a 0.4 mm lift.

The target opening of the flow passage area variable valve 58 is set to be fully open in the low velocity high load region R1, and set to be fully closes in the other regions R2, R3. Specifically, in the low velocity high load region R1, each of the high velocity-side passages 53 is blocked and the exhaust emitted from the engine body 1 flows downstream by only passing through the low velocity-side passages 54. Meanwhile, in the other regions R2, R3, the respective high velocity-side passages 53 are released and the exhaust emitted from the engine body 1 flows downstream upon passing through the high velocity-side passages 53 and the low velocity-side passages 54.

The ECU 2 stores a map of the pre-set target opening of the flow passage area variable valve 58, and the ECU 2 extracts the target opening of the flow passage area variable valve 58 from the map according to the driving conditions.

The intake performance of the engine system 100 configured as described above is now explained.

When the exhaust valve 20 of a predetermined cylinder 12 (hereinafter referred to as the "exhaust stroke cylinder 12" as appropriate) is opened, the exhaust flows from the exhaust port 18 of this cylinder 12 into the independent exhaust passage 52 at a high velocity. In particular, immediately after the exhaust valve 20 is opened, gas of an extremely high velocity (so-called blow down gas) is discharged from the cylinder 12.

Here, in the low velocity high load region R1, since the high velocity-side passages 53 are blocked and only the low velocity-side passages 54 among the independent exhaust passages 52 are released, the exhaust discharged from the exhaust stroke cylinder 12 flows only into the low velocity-side passages 54. As described above, the flow passage area of the low velocity-side passages 54 is set to be smaller than the high velocity-side passages 53. Moreover, with the low velocity-side collection part 56 provided downstream of the low velocity-side passages 54, its flow passage area becomes smaller as it heads downstream. Accordingly, the exhaust pass through the low velocity-side collection part 56 at a high velocity.

When the high-velocity exhaust is ejected from a predetermined low velocity-side passage 54 to the low velocity-side collection part 56, as described above, force for pumping the gas in the other low velocity-side passages 54 in communication with the low velocity-side collection part 56 toward the downstream side is applied to the other low velocity-side passages 54 based on the ejector effect. When the exhaust valve 20 of the exhaust stroke cylinder 12 is opened, the other cylinders 12 (hereinafter referred to as the "intake stroke cylinders 12") for which the exhaust sequence is set to be previous to the exhaust stroke cylinder 12 are in the overlap period, and their exhaust valve 20 and intake valve 19 are both open. Thus, the residual gas in the intake stroke cylinders 12 is pumped with great force from the cylinders 12 toward the independent exhaust passages 52 based on the foregoing pumping force.

In particular, the downstream ends of the respective low velocity-side passages 54 are disposed adjacent to each other in the low velocity-side collection part 56. Thus, the pumping force based on the low velocity-side passage 54 connected to the exhaust stroke cylinder 12 effectively works on the low velocity-side passages 54 connected to the intake stroke cylinders 12, and a large amount of residual gas is pumped out from the intake stroke cylinders 12.

Here, the second cylinder 12b and the third cylinder 12c are connected to the same independent exhaust passage 52, and the exhaust emitted from the second cylinder 12b and the third cylinder 12c flows into the same low velocity-side passage 54, but exhaust sequence of the second cylinder 12b and the third cylinder 12c is inconsecutive, and the exhausts emitted from these cylinders 12b, 12c passes through the low velocity-side passage 54 without interfering with each other.

The engine system 100 is thereby able to effectively exhibit the ejector effect in the low velocity high load region R1, and promote the scavenging of the respective cylinders 12 and thereby increase the engine output.

Meanwhile, the high velocity-side passages 53 are opened in the high velocity region R3, and the exhaust emitted from the cylinders 12 to the independent exhaust passages 52 flows into the high velocity-side passages 53 in addition to the low velocity-side passages 54. As described above, the flow passage area of the high velocity-side passages 53 is set to be greater than the flow passage area of the low velocity-side passages 54, and most of the exhaust passes through the high velocity-side passages 53. The gas that has passed through the high velocity-side passages 53 flows into the high velocity-side collection part 57. As described above, with the high velocity-side collection part 57, a2/D2 is set to be small and its flow passage area is set to be greater than the total area of the downstream end of the respective high velocity-side passages 53. Thus, the exhaust that has passed through the respective high velocity-side passages 53 passes through the high velocity-side collection part 57 in a state where the exhaust resistance is small. It is thereby possible to reduce the pressure of the downstream end of the high velocity-side passage 53; that is, the back pressure of the respective high velocity-side passages 53.

The engine system 100 is thereby able to reduce the back pressure in the high velocity region R3 where the exhaust flow rate is high and the back pressure tends to become high, and promote the scavenging of the cylinders 12 and thereby ensure the engine output.

Here, with the low velocity low load region R2, the intake pressure is small. Thus, if the intake valve 19 and the exhaust valve 20 are caused to overlap, the exhaust may flow backward toward the intake side and deteriorate the air-intake, and consequently the engine output.

Meanwhile, with the engine system 100, since the intake valve 19 and the exhaust valve 20 are set so that they do not overlap or so that the overlap period is sufficiently short in the low velocity low load region R2 and the high velocity-side passages 53 are released, the engine output is ensured as a result of avoiding the foregoing backward flow.

As described above, according to the engine system 100, it is possible to increase the intake efficiency in all velocity regions and thereby increase the engine output.

Here, the low velocity-side collection part 56 and the high velocity-side collection part 57 may be shaped such that their cross-sectional shape is constant from its upstream end to its downstream end. For example, as the shape where the low velocity-side collection part 56 and the high velocity-side collection part 57 both have a constant cross-sectional area, a1/D1 of the low velocity-side collection part 56 and a2/D2 of the high velocity-side collection part 57 can be respectively set to a1/D1=a2/D2=0.57.

Moreover, in the foregoing embodiment, although a case was explained where the engine body 1 is an in-line four-cylinder engine, the exhaust ports 18 of the second cylinder 12*b* and the third cylinder 12*c* are connected to one independent exhaust passage 52*b*, and three independent exhaust passages 52*b* are provided, it is also possible to provide four independent exhaust passages 52*b* as a result of the exhaust ports 18 of the respective cylinders 12 being respectively and individually connected to the independent exhaust passage 52*b*. However, if the exhaust ports of cylinders for which the exhaust sequence is inconsecutive are collectively connected to one independent exhaust passage 52*b*, the downsizing of the system can be realized.

Moreover, upon providing four independent exhaust passages 52*b* separating the independent exhaust passages 52*b* respectively into four low velocity-side passages 54 and high velocity-side passages 53, the total cross-sectional area of the downstream end of the low velocity-side passages 54 will become greater than the cross-sectional area of the downstream end of the low velocity-side collection part 56 as a result of achieving a1/D1≥0.5, and the total cross-sectional area of the downstream end of the high velocity-side passage 53 will become smaller than the cross-sectional area of the downstream end of the high velocity-side collection part 57 as a result of achieving a2/D2≤0.5. Thus, upon providing four independent exhaust passages 52*b*, preferably, a1/D1≥0.5 and a2/D2≤0.5.

Moreover, in the foregoing embodiment, although a case was explained where the flow passage area variable valve 58 is driven to the full close position in the low velocity high load region R1, the position of the flow passage area variable valve 58 in the low velocity high load region R1 is not limited to the full close position, and will suffice if it is more closed than the full open position; that is, a position where the flow passage area of the high velocity-side passages 53 is smaller than the maximum area.

Note that, if the position of the flow passage area variable valve 58 in the low velocity high load region R1 is set to be more open than the full close position, the exhaust will pass through the high velocity-side passage 53 while being narrowed at a position where the flow passage area variable valve 58 is provided in the low velocity high load region R1, and the ejector effect can also be obtained in the high velocity-side passages 53. Thus, in the case of the foregoing setting, preferably, the downstream ends of the high velocity-side passages 53 connected to the cylinders 12 for which the exhaust sequence is inconsecutive are arranged at a mutually adjacent position so that the negative pressure generated from the exhaust ejected from the high velocity-side passages 53 connected to the cylinders 12 performing the exhaust stroke will effectively work to promote the scavenging of these cylinders.

Moreover, the flow passage area variable valve 58 may also be gradually or sequentially changed between the full open position and the full close position in the low velocity high load region R1. In the foregoing case, preferably, the flow passage area variable valve 58 is driven so that the flow passage area of the high velocity-side passages 53 becomes large as the engine revolution NE increases. According to this configuration, in a region where the engine revolution NE is low and the flow rate of the exhaust is low, the scavenging can be promoted based on the ejector effect as a result of reducing the flow passage area of the high velocity-side passages 53, and, in a region where the engine revolution NE is high and the flow rate of the exhaust is high, the scavenging can be promoted by increasing the flow passage area of the high velocity-side passages 53 and thereby reducing the exhaust resistance, and the intake efficiency can thereby be improved.

Moreover, the position of the catalytic device 6 is not limited to the foregoing position. However, according to the engine system 100, since the intake efficiency can be increased based on the ejector effect and by reducing the back pressure, it is effective in an engine system without a turbocharger. In cases where a turbocharger is not provided as described above, the catalytic device 6 can be directly connected to the respective independent exhaust passages 53 and disposed at a position that is more upstream as in the foregoing embodiment, and it is thereby possible to maintain the high temperature of the exhaust flowing into the catalyst body 64 and activate the catalyst body 64 at an early stage.

Moreover, even in the low velocity low load region R2, it is possible to overlap the intake valve 19 and the exhaust valve 20 and block the high velocity-side passages 53, and increase the intake efficiency by causing the pumping force based on the ejector effect to work on the cylinders 12.

Moreover, in the foregoing embodiment, although a case was explained where the independent exhaust passage 52 is connected to the downstream of the exhaust port 18 and separated into the high velocity-side passages 53 and the low velocity-side passages 54 on the downstream side of the independent exhaust passage 52, for example, it is also possible to connect the high velocity-side passages to one exhaust port 18 of the two exhaust port and connect the low velocity-side passage to the other exhaust port 18 independently from the high velocity-side passage. It is also possible to cause the exhaust valve 20 of the exhaust port 18 connected to the high velocity-side passage to function as the flow passage area variable valve. Specifically, the flow passage area of the high velocity-side passages can be changed by opening and closing one exhaust valve 20.

Accordingly, the present invention provides an exhaust system of a multi-cylinder engine including a plurality of cylinders each formed with an intake port and an exhaust port and provided with an intake valve capable of opening and closing the intake port and an exhaust valve capable of opening and closing the exhaust port, comprising a plurality of independent exhaust passages each of which is connected to an exhaust port of one cylinder or each of a plurality of cylinders for which the exhaust sequence is inconsecutive, and which are respectively separated at least on a downstream side into low velocity-side passages and high velocity-side passages, a low velocity-side collection part which is connected to a downstream end of each of the low velocity-side passages to be in communication with each of the low velocity-side passages and which collects gas that has passed through each of the low velocity-side passages, a high velocity-side collection part which is connected to a downstream end of each of the high velocity-side passages to be in communication with each of the high velocity-side passages and which collects gas that has passed through each of the high velocity-side passages, a flow passage area variable valve which is provided to each of the high velocity-side passages and which is capable of changing a flow passage area of each of the high velocity-side passages, flow passage area variable valve drive means capable of driving the flow passage area variable valve, and valve drive means capable of driving the intake valve and the exhaust valve of each of the cylinders, wherein, in a low velocity region in which a revolution of an engine is lower than a pre-set reference revolution and at least in a high load region where a required torque of the engine is high, the valve drive means drives the intake valve and the exhaust valve of each of the cylinders so that an opening period of the intake valve and an opening period of the exhaust valve of each of the cylinders overlap for a predetermined overlap period and so that, between cylinders for which the exhaust sequence is consecutive, the exhaust valve of one cylinder is opened during the overlap period of another cylinder, wherein the flow passage area variable valve drive means drives the flow passage area variable valve so that a flow passage area of each of the high velocity-side passages is smaller than its maximum area at least in the high load region of the low velocity region, and drives the flow passage area variable valve so that the flow passage area of each of the high velocity-side passages is a maximum area in a high velocity region where the revolution of the engine is higher than the reference revolution, wherein the downstream ends of the low velocity-side passages connected to the cylinders for which the exhaust sequence is consecutive among the respective low velocity-side passages are arranged in mutually adjacent positions, wherein the low velocity-side collection part is shaped so that a flow passage area of at least one of its upstream end and its downstream end is a smallest area of the flow passage area of the low velocity-side collection part, and wherein the high velocity-side collection part is shaped so that a flow passage area of at least one of its upstream end and its downstream end is a smallest area of the flow passage area of the high velocity-side collection part, and shaped so that a relationship $a1/D1 \geq a2/D2$ is satisfied where $a1$ is a diameter of a true circle with a same area as the flow passage area of the downstream end of the low velocity-side passages, $D1$ is a diameter of a true circle with a same area as the flow passage area of the downstream end of the low velocity-side collection part, $a2$ is a diameter of a true circle with a same area as the flow passage area of the downstream end of the high velocity-side passages, and $D2$ is a diameter of a true circle with a same area as the flow passage area of the downstream end of the high velocity-side collection part.

This system is configured so that, at least in the high load region of the low velocity region, the flow passage area of the high velocity-side passage is reduced with the flow passage area variable valve to narrow the flow passage area of the independent exhaust passage, and the exhaust passes through the independent exhaust passage at a high velocity, and the gas in the other independent exhaust passages is pumped out based on the ejector effect as a result of high-velocity exhaust being ejected from a predetermined independent exhaust passage. Here, at least at the high load region of the low velocity region, during the overlap period of a predetermined cylinder, the exhaust valve of the other cylinders is opened, and the gas in the cylinder in the overlap period is pumped out based on the ejector effect as a result of high-velocity exhaust being ejected from a predetermined independent exhaust passage pursuant to the opening of the foregoing exhaust valve. Thus, the scavenging in the cylinder in the overlap period; that is, the cylinder performing the intake stroke is promoted and the intake efficiency is thereby improved.

In particular, the respective low velocity-side passages through which the exhaust mainly passes through when the flow passage area of the high velocity-side passage is reduced are disposed such that the low velocity-side passages connected to cylinders for which the exhaust sequence is consecutive are mutually adjacent in the low velocity-side collection part, and the scavenging in the cylinder is further promoted since the negative pressure generated from the high-velocity exhaust ejected from a predetermined low velocity-side passage pursuant to the opening of the exhaust valve will more effectively work on the low velocity-side passages connected to the cylinders in the overlap period.

Here, when the flow passage area of the independent exhaust passage is narrowed in cases where the flow rate of the exhaust is high, the discharge of the exhaust may be inhibited due to the increase in the exhaust resistance, and the scavenging performance may deteriorate. Meanwhile, with the present system, in the high velocity region where the flow rate of the exhaust is high, the flow passage area of the high velocity-side passage is set to be the maximum area and the exhaust resistance is inhibited as a result of ensuring the flow passage area of the independent exhaust passage, and the intake efficiency can also be improved in the high velocity region.

In particular, the relationship of the diameter $a1$ of a true circle with the same area as the flow passage area of the downstream end of the low velocity-side passages, the diameter $D1$ of a true circle with the same area as the flow passage area of the downstream end of the low velocity-side collection part, the diameter $a2$ of a true circle with the same area of the flow passage area of the downstream end of the high velocity-side passages, and the diameter $D2$ of a true circle with the same area as the flow passage area of the downstream end of the high velocity-side collection part is set to be $a1/D1 \geq a2/D2$. In addition, the flow passage area of the downstream end in the low velocity-side collection part is set to be smaller relative to the flow passage area of the downstream end of the low velocity-side passages, and the flow passage area of the downstream end in the high velocity-side collection part is set to be greater relative to the flow passage area of the downstream end of the high velocity-side passage in order to inhibit the velocity of the gas ejected from the low velocity-side passage to the low velocity-side collection part from deteriorating in the low velocity-side collection part, and lower the internal pressure of the high velocity-side collection part in order to reduce the exhaust resistance. Thus, with this system, at least in the high load region of the low velocity region where the exhaust mainly passes through the low velocity-side collection part, it is possible to reliably promote the scavenging by causing the pumping force of the gas ejected to the low velocity-side collection part to more effectively work on the cylinder in the overlap period, reliably reduce the exhaust resistance in the high velocity region where the exhaust passes through the high velocity-side passage, and thereby increase the intake efficiency.

As described above, according to the present invention, it is possible to inhibit the exhaust resistance in the high velocity region and promote the scavenging in the cylinders while effectively using the ejector effect to promote the scavenging in the cylinders at least in the high load region of the low velocity region, and thereby increase the intake efficiency in all velocity regions and increase the engine output.

Moreover, preferably, the flow passage area of each of the high velocity-side passages is set to be greater than the flow passage area of each of the low velocity-side passages. According to this configuration, at least in the high load region of the low velocity region, the flow passage area of the low velocity-side passage through which the exhaust mainly passes through can be sufficiently narrowed to effectively exhibit the ejector effect, and, since the flow passage area of the independent exhaust passage is secured and the exhaust resistance is reliably reduced in the high velocity region, the intake efficiency can be further increased.

Furthermore, preferably, the low velocity-side collection part is shaped so that the flow passage area of its upstream end is approximately the same as the total area of the flow passage areas of the downstream end of the low velocity-side passages, and so that the flow passage area is constant from its upstream end to its downstream end or the flow passage area on its downstream side is smaller than the flow passage area on its upstream side. According to this configuration, the exhaust that flows from the low velocity-side passage to the low velocity-side collection part passes through the low velocity-side collection part in a state where the reduction of its velocity is inhibited. Thus, high pumping force is applied to the cylinder in the overlap period based on the exhaust passing through the low velocity-side collection part at a high velocity, and the scavenging is further promoted.

In addition, preferably, the high velocity-side collection part is shaped so that the flow passage area is greater than a total area of the flow passage areas of the downstream end of the high velocity-side passages from its upstream end to its downstream end. According to this configuration, since a large volume of the high velocity-side collection part is secured, the exhaust resistance can be reliability reduced in the high velocity-side passage and the high velocity region where the exhaust passes through the high velocity-side collection part. In particular, since the flow passage area of the downstream end of the high velocity-side collection part is greater than the total flow passage area of the downstream end of the high velocity-side passages, the exhaust can flow from the high velocity-side collection part to the downstream side with less resistance, and the exhaust resistance is thereby reduced and the intake efficiency is consequently increased.

Although there is no limitation in the number of independent exhaust passages, low velocity-side passages and high velocity-side passages, three passages may be used for each of the passages. In the foregoing case, preferably, $a1/D1 \geq 0.57$ is achieved in order to cause the flow passage area of the downstream end of the low velocity-side collection part to be smaller than the total flow passage area of the downstream end of the respective low velocity-side passages and maintain the high velocity of the gas passing through the low velocity-side collection part so as to effectively exhibit the ejector effect at least in the high load region of the low velocity region. In addition, preferably, $a2/D2 \leq 0.57$ is achieved in order to cause the flow passage area of the downstream end of the high velocity-side collection part to be greater than the total flow passage area of the downstream end of the respective high velocity-side passages so as to reduce the pressure in the high velocity-side collection part, and thereby reduce the exhaust resistance in the high velocity region.

Here, with a system provided with four cylinders which are disposed in series in a state where the exhaust sequence of the two cylinders provided at the center is inconsecutive, and in which one independent exhaust passage among the independent exhaust passages is connected respectively to the exhaust port of the two cylinders provided at the center and the other independent exhaust passages are respectively and individually connected to the two cylinders at either end, it is possible to downsize the overall system while effectively exhibiting the ejector effect at least in the high load region of the low velocity region and reducing the exhaust resistance in the high velocity region in comparison to a case where the independent exhaust passages are individually connected to the respective cylinders.

Moreover, it is also possible to provide four independent exhaust passages, four low velocity-side passages and four high velocity-side passages and achieve $a1/D1 \geq 0.5$ in order to cause the flow passage area of the downstream end of the low velocity-side collection part to be smaller than the total flow passage area of the downstream end of the respective low velocity-side passages and maintain the high velocity of the gas passing through the low velocity-side collection part so as to effectively exhibit the ejector effect, and achieve $a2/D2 \leq 0.5$ in order to cause the flow passage area of the downstream end of the high velocity-side collection part to be greater than the total flow passage area of the downstream end of the respective high velocity-side passages so as to reduce the pressure in the high velocity-side collection part and thereby reduce the exhaust resistance.

As described above, according to the present invention, the intake efficiency can be sufficiently increased even without using a turbocharger. Thus, the present invention is particularly effective as a system without a turbocharger comprising a final collection part connected to the downstream end of the low velocity-side collection part and the downstream end of the high velocity-side collection part to be in communication with the low velocity-side collection part and the high velocity-side collection part, and which collects gas that has passed through the low velocity-side collection part and gas that has passed through the high velocity-side collection part, and a catalytic device capable of purifying the exhaust emitted from each of the cylinders, wherein the catalytic device is connected directly to the downstream end of the final collection part.

This application is based on Japanese Patent application No. 2010-082193 filed in Japan Patent Office on Mar. 31, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust system of a multi-cylinder engine including a plurality of cylinders each formed with an intake port and an exhaust port and provided with an intake valve capable of opening and closing the intake port and an exhaust valve capable of opening and closing the exhaust port, comprising:

a plurality of independent exhaust passages each of which is connected to an exhaust port of one cylinder or each of a plurality of cylinders for which the exhaust sequence is inconsecutive, and which are respectively separated at least on a downstream side into low velocity-side passages and high velocity-side passages;

a low velocity-side collection part which is connected to a downstream end of each of the low velocity-side passages to be in communication with each of the low velocity-side passages and which collects gas that has passed through each of the low velocity-side passages;

a high velocity-side collection part which is connected to a downstream end of each of the high velocity-side passages to be in communication with each of the high velocity-side passages and which collects gas that has passed through each of the high velocity-side passages;

a flow passage area variable valve which is provided to each of the high velocity-side passages and which is capable of changing a flow passage area of each of the high velocity-side passages;

flow passage area variable valve drive means capable of driving the flow passage area variable valve; and valve drive means capable of driving the intake valve and the exhaust valve of each of the cylinders, wherein, in a low velocity region in which a revolution of an engine is lower than a pre-set reference revolution and at least in a high load region where a required torque of the engine is high, the valve drive means drives the intake valve and the exhaust valve of each of the cylinders so that an opening period of the intake valve and an opening period of the exhaust valve of each of the cylinders overlap for a predetermined overlap period and so that between cylinders for which the exhaust sequence is consecutive, the exhaust valve of one cylinder is opened during the overlap period of another cylinder, the flow passage area variable valve drive means drives the flow passage area variable valve so that a flow passage area of each of the high velocity-side passages is smaller than its maximum area at least in the high load region of the low velocity region, and drives the flow passage area variable valve so that the flow passage area of each of the high velocity-side passages is a maximum area in a high velocity region where the revolution of the engine is higher than the reference revolution, the downstream ends of the low velocity-side passages connected to the cylinders for which the exhaust sequence is consecutive among the respective low velocity-side passages are arranged in mutually adjacent positions, the low velocity-side collection part is shaped so that a flow passage area of at least one of its upstream end and its downstream end is a smallest area of the flow passage area of the low velocity-side collection part, and the high velocity-side collection part is shaped so that a flow passage area of at least one of its upstream end and its downstream end is a smallest area of the flow passage area of the high velocity-side collection part, and shaped so that a relationship $a1/D1 \geq a2/D2$ is satisfied where $a1$ is a diameter of a true circle with a same area as the flow passage area of the downstream end of the low velocity-side passages, $D1$ is a diameter of a true circle with a same area as the flow passage area of the downstream end of the low velocity-side collection part, $a2$ is a diameter of a true circle with a same area as the flow passage area of the downstream end of the high velocity-side passages, and $D2$ is a diameter of a true circle with a same area as the flow passage area of the downstream end of the high velocity-side collection part.

2. The exhaust system of a multi-cylinder engine according to claim 1, wherein the flow passage area of each of the high velocity-side passages is set to be greater than the flow passage area of each of the low velocity-side passages.

3. The exhaust system of a multi-cylinder engine according to claim 2, wherein the low velocity-side collection part is shaped so that the flow passage area of its upstream end is approximately the same as a total area of the flow passage areas of the downstream end of the low velocity-side passages, and so that the flow passage area is constant from its upstream end to its downstream end or the flow passage area on its downstream side is smaller than the flow passage area on its upstream side.

4. The exhaust system of a multi-cylinder engine according to claim 3, wherein the high velocity-side collection part is shaped so that the flow passage area is greater than a total area of the flow passage areas of the downstream end of the high velocity-side passages from its upstream end to its downstream end.

5. The exhaust system of a multi-cylinder engine according to claim 4, wherein the exhaust system comprises three independent exhaust passages, three low velocity-side passages and three high velocity-side passages, the low velocity-side collection part is shaped so that a relationship $a1/D1 \geq 0.57$ is satisfied where $a1$ is the diameter of the true circle with the same area as the flow passage area of the downstream end of the low velocity-side passages, and $D1$ is the diameter of the true circle with the same area as the flow passage area of the downstream end of the low velocity-side collection part, and the high velocity-side collection part is shaped so that a relationship $a2/D2 \leq 0.57$ is satisfied where $a2$ is the diameter of the true circle with the same area as the flow passage area of the downstream end of the high velocity-side passages, and $D2$ is the diameter of the true circle with the same area as the flow passage area of the downstream end of the high velocity-side collection part.

6. The exhaust system of a multi-cylinder engine according to claim 5, wherein the exhaust system comprises four cylinders arranged in series in a state where the exhaust sequence of two cylinders provided in the center is inconsecutive, and one independent exhaust passage of the independent exhaust passages is connected to the exhaust ports of the two cylinders provided in the center, and the other independent exhaust passages are respectively and individually connected to two cylinders provided at either end.

7. The exhaust system of a multi-cylinder engine according to claim 4, wherein the exhaust system comprises four independent exhaust passages, four low velocity-side passages and four high velocity-side passages, the low velocity-side collection part is shaped so that a relationship $a1/D1 \geq 0.5$ is satisfied where $a1$ is the diameter of the true circle with the same area as the flow passage area of the downstream end of the low velocity-side passages, and $D1$ is the diameter of the true circle with the same area as the flow passage area of the downstream end of the low velocity-side collection part, and the high velocity-side collection part is shaped so that a relationship $a2/D2 \leq 0.5$ is satisfied where $a2$ is the diameter of the true circle with the same area as the flow passage area of the downstream end of the high velocity-side passages, and $D2$ is the diameter of the true circle with the same area as the flow passage area of the downstream end of the high velocity-side collection part.

8. The exhaust system of a multi-cylinder engine according to claim 1, wherein the low velocity-side collection part is shaped so that the flow passage area of its upstream end is approximately the same as a total area of the flow passage areas of the downstream end of the low velocity-side passages, and so that the flow passage area is constant from its upstream end to its downstream end or the flow passage area on its downstream side is smaller than the flow passage area on its upstream side.

9. The exhaust system of a multi-cylinder engine according to claim 8, wherein the high velocity-side collection part is shaped so that the flow passage area is greater than a total area of the flow passage areas of the downstream end of the high velocity-side passages from its upstream end to its downstream end.

10. The exhaust system of a multi-cylinder engine according to claim 9, wherein the exhaust system comprises three independent exhaust passages, three low velocity-side passages and three high velocity-side passages, the low velocity-side collection part is shaped so that a relationship $a1/D1 \geq 0.57$ is satisfied where $a1$ is the diameter of the true circle with the same area as the flow passage area of the downstream end of the low velocity-side passages, and $D1$ is the diameter of the true circle with the same area as the flow passage area of the downstream end of the low velocity-side collection part, and the high velocity-side collection part is shaped so that a relationship $a2/D2 \leq 0.57$ is satisfied where $a2$ is the diameter of the true circle with the same area as the flow passage area of the downstream end of the high velocity-side passages, and $D2$ is the diameter of the true circle with the same area as the flow passage area of the downstream end of the high velocity-side collection part.

11. The exhaust system of a multi-cylinder engine according to claim 10, wherein the exhaust system comprises four cylinders arranged in series in a state where the exhaust sequence of two cylinders provided in the center is inconsecutive, and one independent exhaust passage of the independent exhaust passages is connected to the exhaust ports of the two cylinders provided in the center, and the other independent exhaust passages are respectively and individually connected to two cylinders provided at either end.

12. The exhaust system of a multi-cylinder engine according to claim 9, wherein the exhaust system comprises four independent exhaust passages, four low velocity-side passages and four high velocity-side passages, the low velocity-side collection part is shaped so that a relationship $a1/D1 \geq 0.5$ is satisfied where $a1$ is the diameter of the true circle with the same area as the flow passage area of the downstream end of the low velocity-side passages, and $D1$ is the diameter of the true circle with the same area as the flow passage area of the downstream end of the low velocity-side collection part, and the high velocity-side collection part is shaped so that a relationship $a2/D2 \leq 0.5$ is satisfied where $a2$ is the diameter of the true circle with the same area as the flow passage area of the downstream end of the high velocity-side passages, and $D2$ is the diameter of the true circle with the same area as the flow passage area of the downstream end of the high velocity-side collection part.

13. The exhaust system of a multi-cylinder engine according to claim 1, further comprising:

a final collection part which is connected to the downstream end of the low velocity-side collection part and the downstream end of the high velocity-side collection part to be in communication with the low velocity-side collection part and the high velocity-side collection part, and which collects gas that has passed through the low velocity-side collection part and gas that has passed through the high velocity-side collection part; and a catalytic device capable of purifying an exhaust emitted from each of the cylinders, wherein the catalytic device is connected directly to a downstream end of the final collection part.

* * * * *